(12) United States Patent
Kim

(10) Patent No.: US 6,351,595 B1
(45) Date of Patent: *Feb. 26, 2002

(54) METHOD FOR FINE RECORDING OF VIDEO FRAMES

(75) Inventor: Hyun-Sang Kim, Kyungkido (KR)

(73) Assignee: LG Electronics Inc., Seoul (KR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/064,828

(22) Filed: Apr. 23, 1998

(30) Foreign Application Priority Data

Apr. 25, 1997 (KR) ............................................. 97-16484

(51) Int. Cl.$^7$ ................................................. H04N 5/76
(52) U.S. Cl. ............................... 386/46; 52/61; 52/81; 52/95
(58) Field of Search ............................... 386/46, 52, 83, 386/95, 60, 68, 61, 65, 4, 79, 80, 81; H04N 5/76

(56) References Cited

U.S. PATENT DOCUMENTS

| | | | | |
|---|---|---|---|---|
| 4,673,991 A | * | 6/1987 | Namiki et al. ................. | 386/95 |
| 4,805,042 A | * | 2/1989 | Nishikata ...................... | 386/61 |
| 4,823,198 A | * | 4/1989 | Okumura ....................... | 386/4 |
| 5,287,224 A | * | 2/1994 | Tsuchiya et al. ............... | 386/60 |
| 5,291,301 A | * | 3/1994 | Lee ............................... | 386/83 |
| 5,390,027 A | * | 2/1995 | Henmi et al. .................. | 386/83 |
| 5,410,438 A | * | 4/1995 | Inoue ............................ | 386/95 |
| 5,477,337 A | * | 12/1995 | Schuler ......................... | 386/52 |
| 5,543,929 A | * | 8/1996 | Mankovitz et al. ............ | 386/46 |
| 5,784,522 A | * | 7/1998 | Yamamura ..................... | 386/46 |

FOREIGN PATENT DOCUMENTS

| | | |
|---|---|---|
| JP | 4-014651 | 1/1992 |
| JP | 4-028074 | 1/1992 |
| JP | 5-036154 | 2/1993 |
| JP | 5-166348 | 7/1993 |
| JP | 8-317356 | 11/1996 |

* cited by examiner

Primary Examiner—Huy Nguyen
(74) Attorney, Agent, or Firm—Finnegan, Henderson, Farabow, Garrett, & Dunner, L.L.P.

(57) ABSTRACT

Disclosed is a method for fine recording of video frames at the contiguous recording portion on the video tape. The fine recording is accomplished by inserting a position identification code, which is generated in a serial order, into every frame of a video signal, recording the resultant video signal on a video tape, memorizing the position identification code of the last frame recorded on the tape when the recording is stopped temporarily, and locating the starting track of the subsequent recording correctly by using the memorized position identification codes when the temporary stop mode is canceled. Thus, the method avoids overlap and eliminates a blank section between the last track of the preceding recorded video signal and the beginning track of the subsequent recorded video signal, which often occur at the recording joint portion on the video tape when the tape is abruptly driven at an initial transient movement due to mode transition between the recording and pause modes.

4 Claims, 5 Drawing Sheets

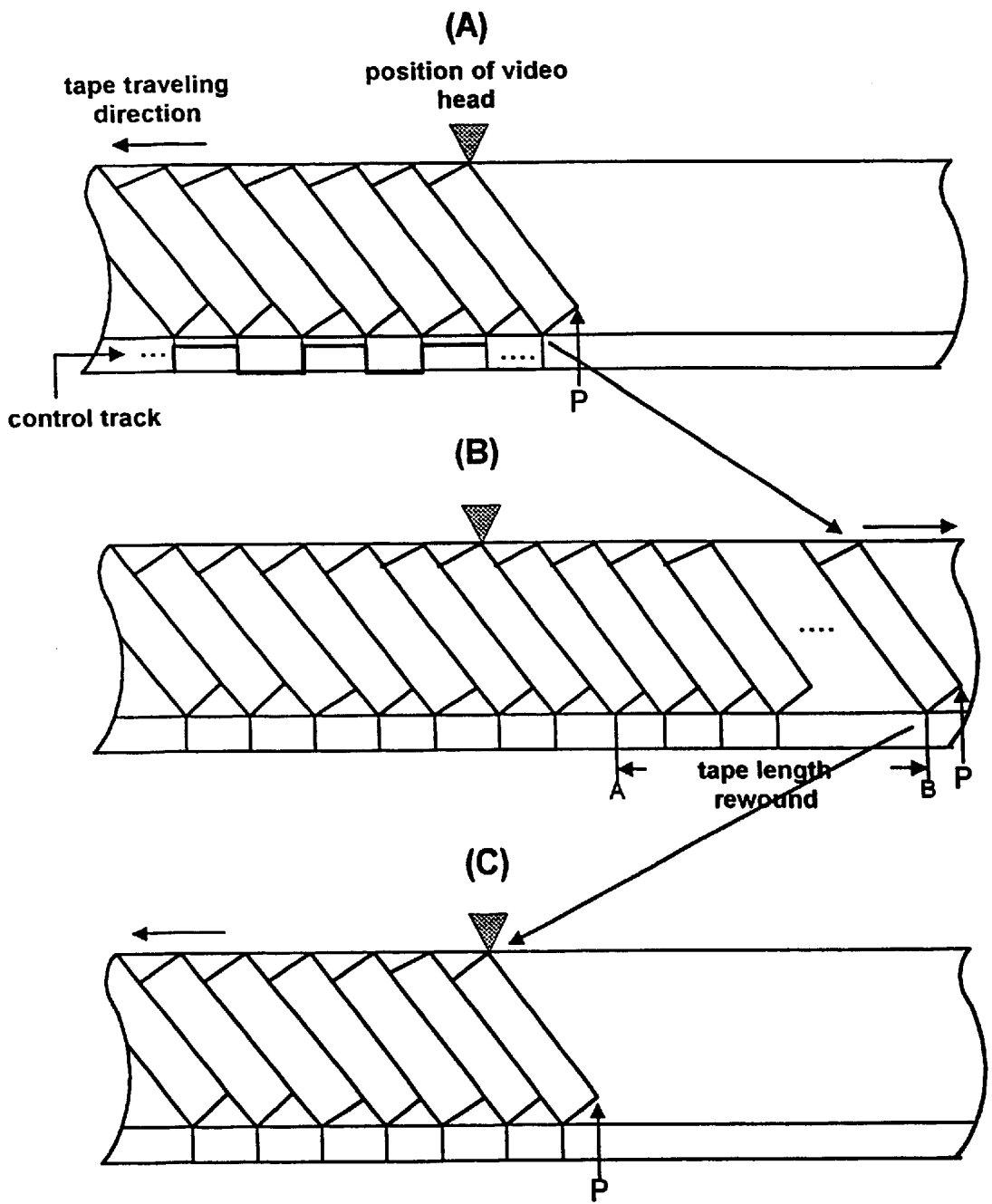

last track of the preceding record
starting track of the subsequent record last track of the preceding record
starting track of the subsequent record

METHOD FOR FINE RECORDING OF VIDEO FRAMES

BACKGROUND OF THE INVENTION

1. Field of the Invention

The present invention relates generally to a method for recording a video signal at a point just adjacent to the last video frame which was previously recorded, and in particular, to a video tape recording method that is capable of precisely locating the beginning track of the subsequent recording at the contiguous recording portion on the video tape on the subsequent recording by recording a unique position identification code together with every frame of the video signal being recorded and reading out the recorded position identification codes when recording is resumed after the recording is stopped temporarily

2. Brief Description of the Prior Art

FIGS. 1A and 1B show the recording/reproducing portion in the video tape recorder which comprises a key pad 1 for inputting control instruction; a memory 3; a control unit 2 for controlling the recording/reproducing unit; and the a recording/reproducing unit 60. The recording/reproducing unit 60 comprises a capstan motor 5 and a capstan shaft 5' for driving the video tape; a motor controller 4 for controlling the speed of the capstan motor 5; a pinch roller 7 which pinches the tape to the capstan shaft 5'; a control head 6 which records and reads control pulses in the control track on the tape; the video heads 9' for recording and reproducing the video signal on the tape; and a rotating drum 9 on which the video heads 9' are mounted.

In the video tape recorder configured as shown in FIGS. 1A and 1B, the prior art for correctly locating the starting track just adjacent to the last track recorded before the temporary recording stop is as follows. When the video tape is stopped temporarily during the recording operation by a stop instruction through the key pad 1, the control unit 2 blocks the video signal which has been fed to the video heads 9' and stops the recording immediately by controlling the motor controller 4 (refer to (A) in FIG. 2). After rewinding the video tape for a predetermined time, the control unit 2 remains on hold waiting for the subsequent recording request (refer to (B) in FIG. 2). During the rewinding, the control head 6 reads 30 Hz control pulses that have been recorded on the control track of the tape, and the control unit 2 counts the number of the reproduced control pulses from the control head 6. The counted value is stored in the memory 3. Instead of the control pulses, a capstan frequency signal (CFG) generated by revolution of the capstan motor 5 can be used.

After that, when the recording operation restarts by inputting a stop cancel instruction through the key pad 1, the video tape starts to move in the forward direction in cooperation with the pinch roller 7 and the capstan shaft 5' without video recording. In this way, the control unit 2 forwards the video tape until the number of control pulses reproduced by the control head 6 is equal to the counted value that is retrieved from the memory 3 (refer to (C) in FIG. 2). Once the video tape is moved by the amount corresponding to the number of the control pulses counted during the rewinding mode, the recording operation is restarted at the location where the recording was temporarily stopped.

For the prior art above, when the video tape moves in the backward direction or in the forward direction (A→B movement in (B) of FIG. 2) by the amount corresponding to the number of control pulses that was counted in the rewinding operation (B→A movement in (B) of FIG. 2), the tape may not adhere closely to the control head 6 or the pinch roller 7 because of the initial transient travel speed of the tape. Thus, the control pulses often fail to be counted precisely in the reproduction operation (A→B movement in (B) of FIG. 2) or the tape may not move by the amount corresponding the counted CFG pulses. For example, P position in (B) of FIG. 2 is not located precisely, resulting in an abrupt change in spacing such as overlap (FIG. 3A) or wide blank section (FIG. 3B) between the last track of the previous recorded video signal and the beginning track of the subsequent recorded video signal in the contiguous recording portion.

SUMMARY OF THE INVENTION

The primary objective of the present invention is to solve the above mentioned problems of the prior methods and to provide a method for continuous video tape recording at the boundary between two video signals recorded during two consecutive record modes by recording position identification codes on the video tape together with video signals and detecting the position identification code thereon.

Another objective of this invention is to provide a method for continuous video tape recording at a contiguous recording portion which can be applied successfully in cases where recording and pause are repeated for a short period of time.

The present invention, a method for continuous video tape recording at a contiguous recording portion, comprises the following steps: generating a unique position identification code for every frame of the video signal to be recorded; summing each of video frames with a signal containing the position identification code and recording the resultant video signal on a video tape; stopping recording of the video signals temporarily and memorizing the position identification code which was recorded on the video tape with the last video frame; and rewinding the video tape for a predetermined period of time.

The method according to the present invention is further characterized in that the value of the position identification code changes in serial order.

If the recording of a video signal is requested by a user, a signal containing a position identification code is superimposed into a particular period within every frame of the video signal and the resulting video signal is recorded on a video tape, the value of the position identification code being changed in serial order. Then, when a temporary recording stop is issued by the user, the recording of the video signal is stopped immediately and at the same time, the position identification code within the last video frame on the tape is memorized. After the tape is rewound by a predetermined amount, it is maintained in a waiting for the subsequent recording. After that, when the temporary recording stop is canceled, the recorded video signal passed by during the rewinding begins to be reproduced. During the reproduction, the unique position identification code is read out from the particular period of every frame of the reproduced video signal and is compared with the memorized position identification code. At the instant the codes coincide each other, the reproduction mode is switched to the recording mode. Thus, the starting track of the subsequent recording is located precisely so that it is closely adjacent to the last track recorded in the preceding recording mode.

Thus, the recording method of the present invention is capable of avoiding overlap and eliminating the blank section between the last track of the preceding recorded video signal and the beginning track of the subsequent recorded video signal, which often arises at the recording joint portion on the tape when the tape is abruptly driven by the initial transient power of a motor on successive operations of recording-and-pause.

Besides a home video tape recorder, the present invention can be applied to a camcorder or a time-lapse video cassette recorder that is used for long-time surveillance or observation.

The above objectives, features, and advantages of the present invention will become apparent from the following detailed description of illustrative embodiments thereof to read in conjunction with the accompanying drawings.

BRIEF DESCRIPTION OF THE DRAWINGS

The accompanying drawings, which are included to provide a further understanding of the invention, illustrate a preferred embodiment of this invention, and together with the description, serve to explain the principles of the present invention.

In the drawings:

FIG. 2 shows diagrams illustrating the sequence of the states of a video tape before and after the recording is resumed, in particular, (A) is a diagram showing the recorded video patterns on the tape when recording is stopped temporarily, (B) is a diagram showing the tape after rewinding, and (C) is a diagram showing a tape that is moving forward when the temporary stop is canceled;

FIG. 3A shows overlapped recording patterns between the last recorded video signal and the subsequent recorded video signal, and FIG. 3B shows a blank section between the last track of the last recorded signal and the starting track of the subsequent recorded signal;

DETAILED DESCRIPTION OF THE PREFERRED EMBODIMENTS

The preferred embodiments of the present invention will be described in detail referring to the accompanying drawings.

Figure 1A:
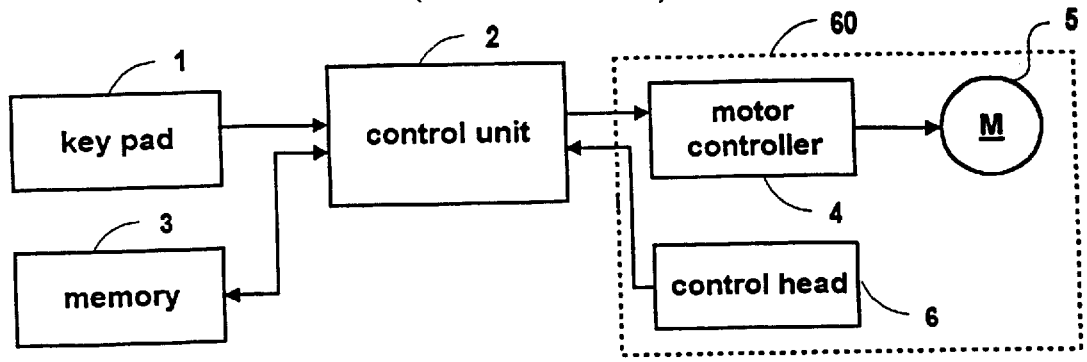
FIGS. 1A and 1B show a general block diagram of a video tape recorder and a diagrammatic view of the recording/reproducing portion in a video tape recorder, respectively.
Figure 1B:
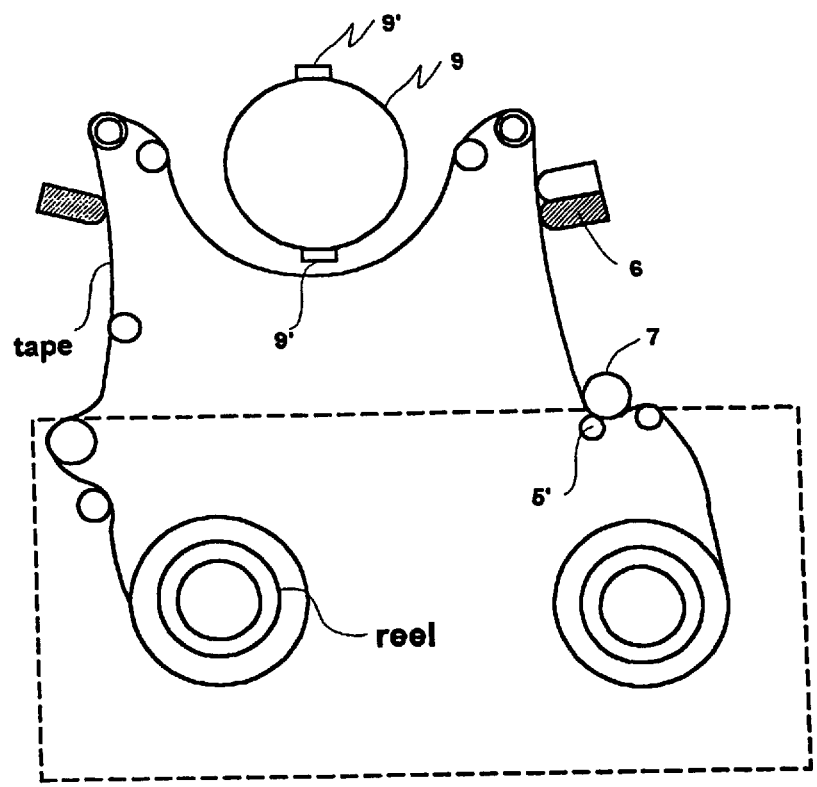
Figure 3A:
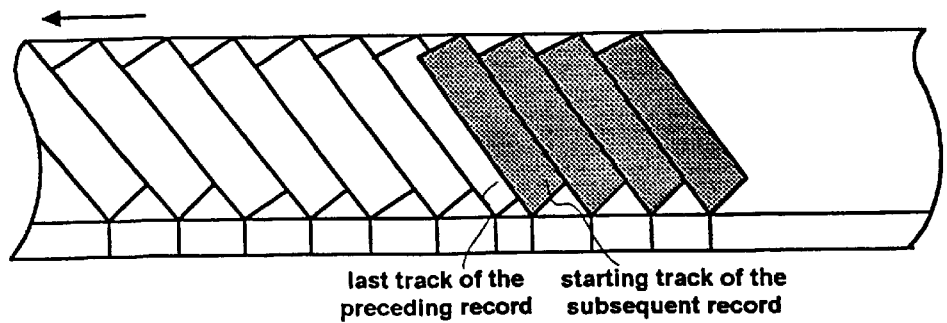
FIGS. 3A and 3B show two undesirable patterns of recorded video frames formed at a recording joint portion on the tape, in particular.
Figure 3B:
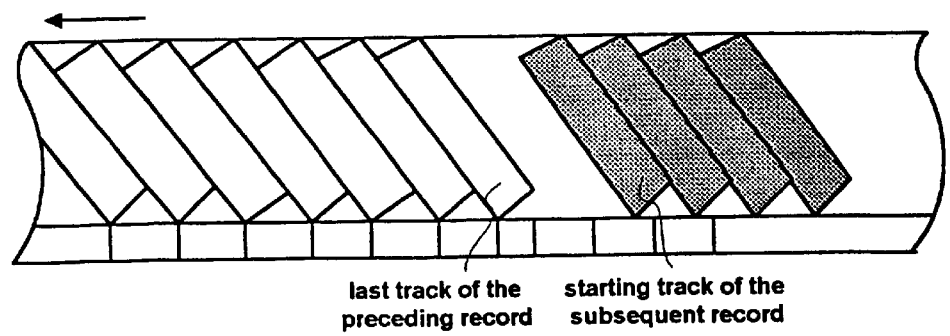
Figure 4:
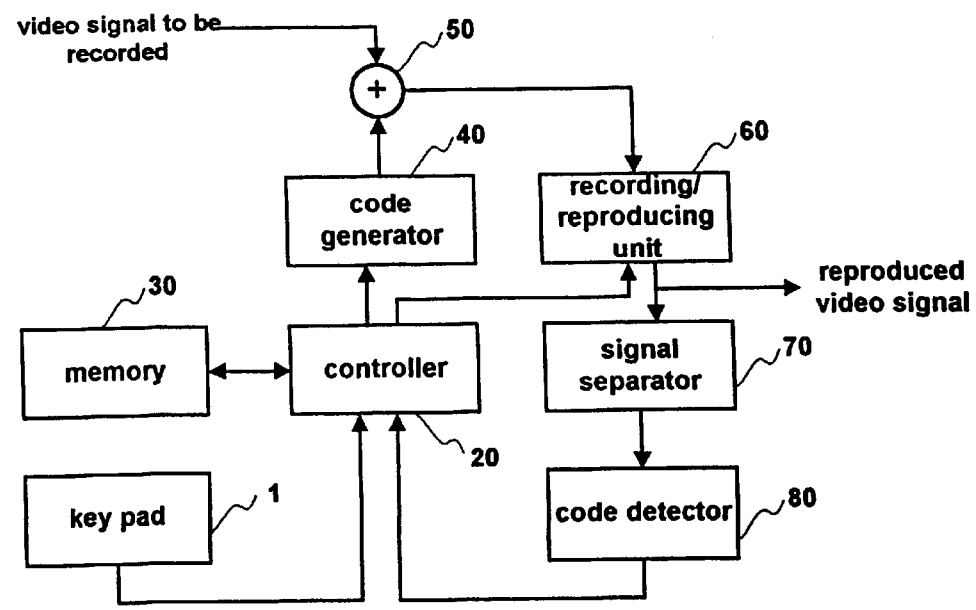
FIG. 4 is a schematic block diagram of a video tape recorder to embody the method according to the present invention.

FIG. 4 shows a block diagram of video tape recorder which embodies the recording method according to the present invention, comprising the following: a key pad 1 for inputting control instruction; a code generator 40 which produces a position identification code (PIC) to be inserted in a predetermined horizontal line within the vertical blanking period of the video signal to be recorded; an adder 50 which adds the PIC signal into the video signal; a recording/reproducing unit 60 for recording and reproducing the added video signal; a signal separator 70 which separates the specified horizontal line from a reproduced video signal; a code detector 80 which extracts the PIC in the separated horizontal line signal; a memory 30; and a controller 20 which assigns the PIC which is increased in serial order to the code generator 40 and controls the recording/reproducing unit 60 according to the user's instruction.

Figure 5:
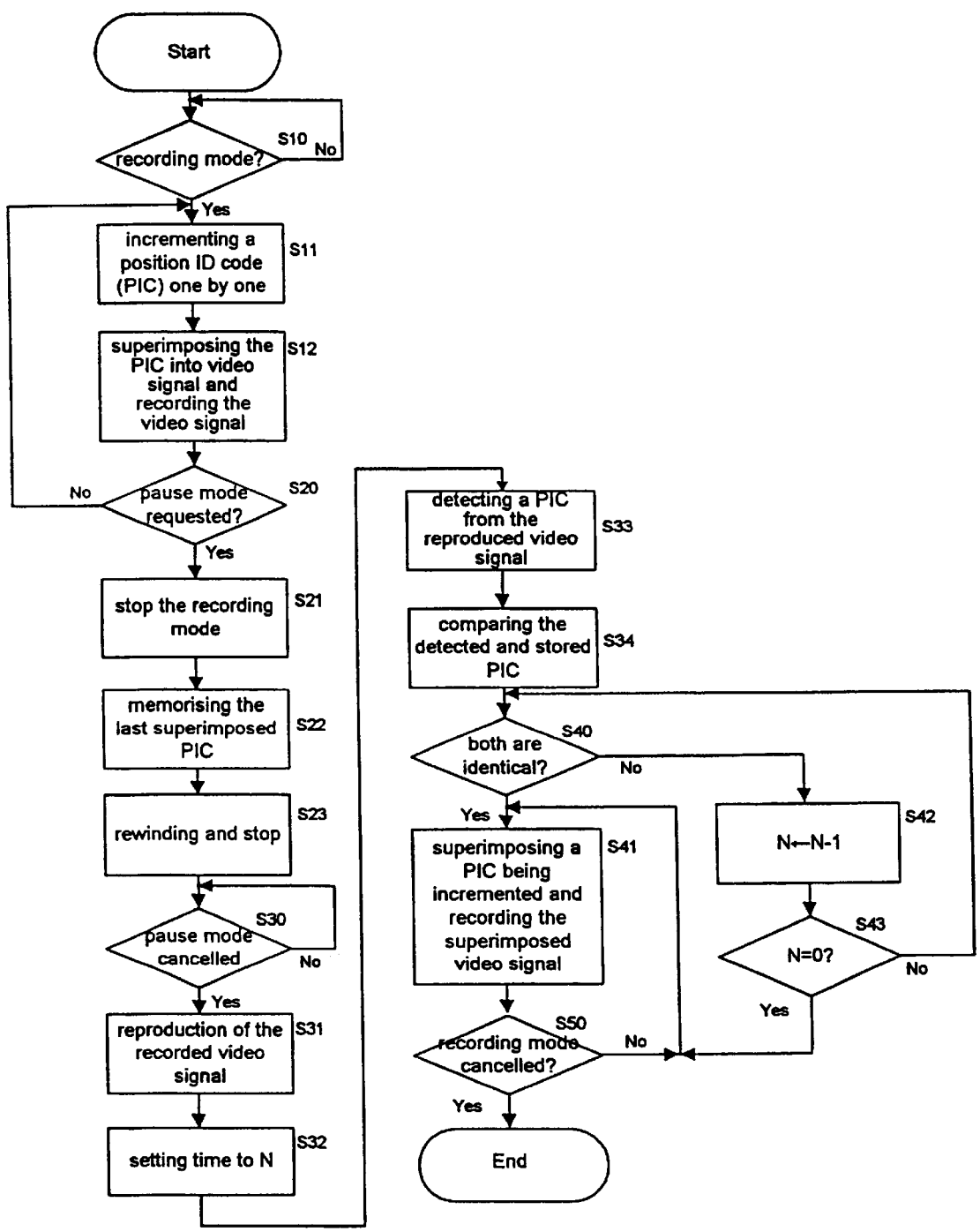
FIG. 5 is a flow chart of a preferred embodiment of the recording method according to the present invention.

FIG. 5 is a flow chart of a preferred embodiment of the recording method according to the present invention. The method will be described in detail with reference to the recorder shown in FIG. 4 and the flow chart of FIG. 5.

When a recording command is issued by a user through the key pad 1 (S10), the recording/reproducing unit 60 starts to record a video signal to be inputted under control of the controller 20. During the recording operation, the PIC is increased by the controller in a serial order (for example, 1,2,3,4 . . . ) and is then fed to the code generator 40 (S11). On receiving the PIC, the code generator 40 produces a signal corresponding to the PIC that will be inserted in a specified horizontal line period within the vertical blanking period of the video signal. Then, the PIC signal is outputted to the adder 50 so that it is superimposed into the video signal (S12), and the resultant signal is fed to the recording/reproducing unit 60. As a result:, the video signal, which of each frame is identifiable by a unique PIC therein, is recorded on the tape (S12). During the recording operation above, the controller 20 checks continuously whether or not a temporary recording stop instruction is inputted by a user through the key pad 1.

When a temporary recording stop or pause instruction is issued (S20), the controller 20 makes the recording/reproducing unit 60 stop the recording operation (S21), and at the same time stores the last PIC which was outputted to the code generator 40 in the memory 30 (S22). And then, after the tape is rewound for a period of time, e.g., two or three seconds or so (S23), the controller 20 stops the tape travel. Once the tape travel is stopped, the controller 20 makes the recording/reproducing unit 60 wait for the issue of a recording stop cancellation instruction through key pad 1 (S30).

When the temporary stop or pause mode is canceled, the controller 20 reads out the PIC (or the PIC recorded on the tape together with the last frame of the video signal) from the memory 30 and makes the recording/reproducing unit 60 reproduce the recorded video signal while moving the tape in the forward direction (S31). Before the reproduction begins, a reproduction duration time is set so that it is slightly longer than the length of time it takes for the tape length traveled during the rewinding mode to travel in the forward direction at a normal speed (S32). The signal separator 70 separates the predetermined horizontal line signal from the reproduced video signal and feeds it to the code detector 80. A PIC is extracted from the horizontal line signal by the code detector 80 (S33) and is fed to the controller 20. For every PIC extracted from the recorded video signals, the controller 20 compares the detected PIC with the PIC read out from the memory 30 (S34) and checks whether both PICs are identical (S40).

Figure 6:
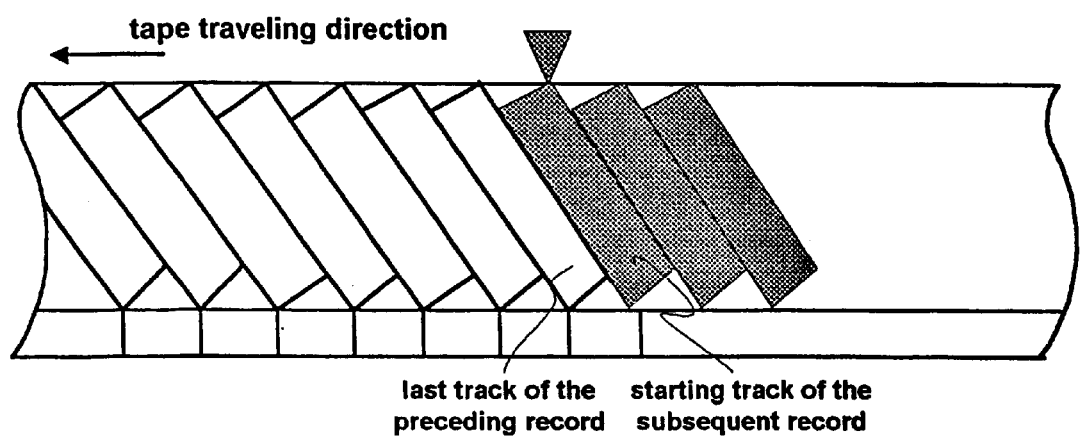
FIG. 6 is a diagram showing the video patterns on the tape recorded by the flows of FIG. 5 at a recording joint portion.

When it is determined that both PICs are equal to each other, the controller 20 makes the recording/reproducing unit 60 turnover the reproduction mode to the recording mode immediately; thus the recording is resumed at the track which is correctly adjacent to the last track of the previously recorded video signal (S41). Therefore, neither overlap nor a blank section as shown in FIG. 6 occurs. In this case, PIC is set to the PIC stored in the memory 30 and is increased in a serial order by the controller 20 as video signals are recorded on the tape, as in the recording operation described above.

While the comparison between two PICs is made, the controller 20 decreases the preset reproduction time (S42)

and checks whether it is equal to zero (S43). If it becomes zero, the reproduction mode is switched to the recording mode by the controller 20 without further extracting PICs from the recorded video signals, thereby preventing continuous reproduction operation that may be caused by code detection errors.

While the recording-and-temporary stop is repeated, the controller 20 determines if a recording stop instruction (STOP) is inputted through the key pad 1 (S50). Given the stop instruction, the recording operation is completed.

Unlike the foregoing embodiment in which PICs are inserted for every frame or field of video signals, it is possible that, only when a temporary recording stop instruction is issued, the PIC is increased by a predetermined amount so as to be greater than that of the preceding temporary recording stop and is then recorded on the video tape along with the video signals. In the case, as in the foregoing embodiment, PICs that are inserted into the video signals at the instant of the issue of the temporary recording stop instruction are stored in the memory, thereby the starting track of the subsequent recording being located correctly based on the PICs.

In this embodiment, the reason why the PIC is changed each time recording is stopped temporarily is to prevent the starting track of the subsequent recording from being wrongly located because of PICs recorded at the preceding temporary stop position in cases where the recording-and-stop is repeated within a short distance of the tape.

The foregoing is provided only for the purpose of illustration and explanation of the preferred embodiments of the present invention, so changes, variations and modifications may be made without departing from the spirit and scope of the invention.

What is claimed is:

1. A method for fine recording of video frames at a video joint portion, controlled by a recording stop and start during a recording operation of a video cassette recorder, comprising the steps of:

generating a position identification code for every frame of a video signal being received the position identification code being changed in a serial order along with the frame of the video signal;

superimposing the generated position identification code into every frame of the video signal;

recording the superimposed video signal on a video tape when a temporary recording stop is requested;

memorizing the position identification code which was superimposed into the last frame recorded on the video tape and rewinding the video tape for a predetermined amount whenever a recording stop is requested;

reproducing a recorded video signal whenever a recording start is requested;

detecting the superimposed position identification code from the reproduced video signal;

comparing the detected position identification code with the position identification code of the last frame memorized at the memorizing step; and stopping the reproduction of the video signal and restarting to record according to the result of the comparing step.

2. A method according to claim 1, wherein the superimposing step includes superimposing said position identification during a vertical blanking period, the position identification code being changed in a serial order along with the frame of the video signal being recorded.

3. A method according to claim 1, wherein said comparing step further comprises the step of confirming whether or not the time elapsed from the beginning of the reproduction goes beyond a predetermined time.

4. An apparatus for fine recording of video frames at a video joint portion, occurred by a recording stop and start during a recording operation of a video cassette recorder, comprising:

a code generator for generating a position identification code, said position identification code being increased in serial order;

an adder for superimposing said generated position identification code into every frame of a video signal;

a memory for memorizing the position identification code which was superimposed into the last frame recorded on the video tape whenever a temporary recording stop is requested;

a recording/reproducing unit for recording and reproducing the added video signal;

a code detector for detecting a superimposed position identification code from a reproduced video signal whenever said temporary recording stop is cancelled;

a comparator for comparing the detected position identification code from the detector with the memorized position identification code; and a controller for controlling the video tape to rewind for a predetermined amount whenever the temporary recording stop is requested and controlling the recording/reproducing unit to resume recording of the video signal based on the result of the comparison whenever the temporary recording stop is cancelled.

* * * * *